(12) United States Patent
Vedage et al.

(10) Patent No.: US 7,910,667 B1
(45) Date of Patent: Mar. 22, 2011

(54) LOW TEMPERATURE CURABLE EPOXY COMPOSITIONS CONTAINING PHENOLIC-BLOCKED UREA CURATIVES

(75) Inventors: Gamini Ananda Vedage, Bethlehem, PA (US); Atteye Houssein Abdourazak, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 36 days.

(21) Appl. No.: 12/557,930

(22) Filed: Sep. 11, 2009

(51) Int. Cl.
*C08L 63/00* (2006.01)
*C08G 14/06* (2006.01)

(52) U.S. Cl. ........ 525/528; 523/400; 523/402; 528/162; 528/164; 528/211

(58) Field of Classification Search ................... 523/400, 523/402; 525/528; 528/158, 162, 164, 211
See application file for complete search history.

(56) References Cited

U.S. PATENT DOCUMENTS

| | | | |
|---|---|---|---|
| 4,094,827 A | 6/1978 | McEntire | |
| 4,845,170 A * | 7/1989 | Paar et al. | 525/452 |
| 4,845,171 A * | 7/1989 | Gmoser et al. | 525/452 |
| 4,857,581 A * | 8/1989 | Paar et al. | 524/591 |
| 5,278,247 A | 1/1994 | Miyazono et al. | |
| 5,294,582 A | 3/1994 | Miyazono et al. | |

FOREIGN PATENT DOCUMENTS

| | | |
|---|---|---|
| EP | 0 193 068 A1 | 9/1986 |
| EP | 0510674 A2 | 10/1992 |
| EP | 1 914 257 A1 | 4/2008 |

* cited by examiner

*Primary Examiner* — Michael J Feely
(74) *Attorney, Agent, or Firm* — Michael K. Boyer

(57) ABSTRACT

A heat curable epoxy composition comprising the contact product of an epoxy resin, an epoxy curing agent and an accelerator for the epoxy curing agent, the curing agent or the accelerator comprising the reaction product of (a) a phenolic resin and (b) a urea compound which is the reaction product of an isocyanate and an alkylated polyalkylenepolyamine having one primary or secondary amine and at least two tertiary amines of the general formula:

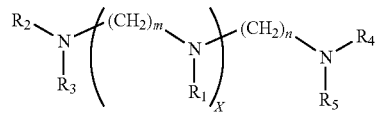

Figure 1:
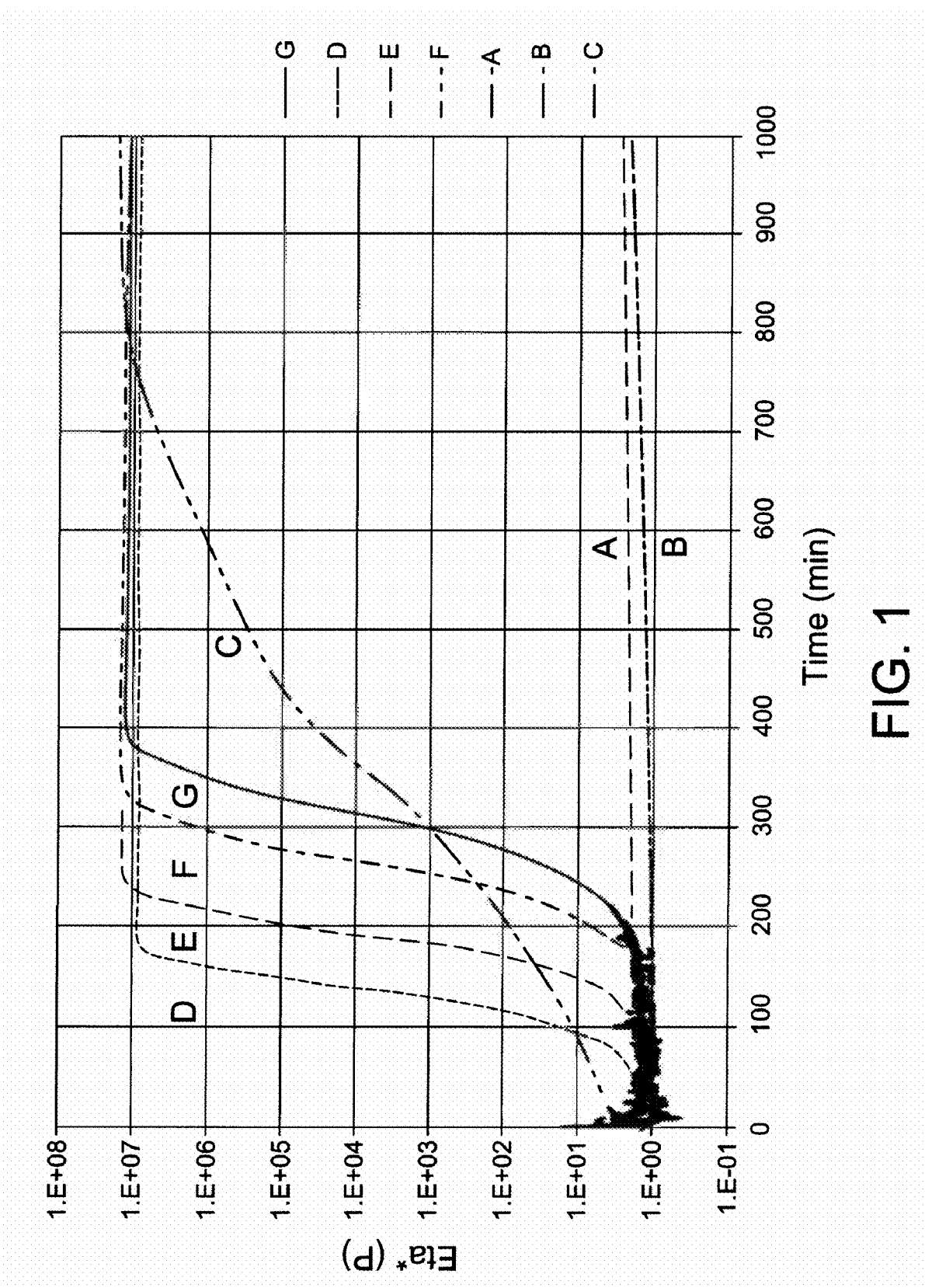

where $R_1$, $R_2$, $R_3$, $R_4$ and $R_5$ independently represent hydrogen, methyl or ethyl; n and m are independently integers from 1 to 6 and; X is an integer from 1 to 10.

21 Claims, 1 Drawing Sheet

LOW TEMPERATURE CURABLE EPOXY COMPOSITIONS CONTAINING PHENOLIC-BLOCKED UREA CURATIVES

BACKGROUND OF THE INVENTION

Epoxy based adhesives are used in various applications in automotive, electronics, aerospace and in the general industries. They are increasingly replacing conventional bonding systems such as soldering, welding, rivets, nails, screws and bolts because of the benefits they provide over these systems. Some of these benefits include bonding similar and dissimilar substrates without damaging them, better distribution of stress over wide area, better fatigue resistance and noise and vibration resistance.

A one-component epoxy based adhesive system is preferred over a two-components system because it eliminates the mixing step, the required time to apply it, the cooling during storage and shipping associated with the two-components system.

The present invention relates to latent curing agents and accelerators for epoxy resins including 100% solids epoxy compositions and water-based compositions, especially one-component 100% solids epoxy compositions. "Latent" curing agents are those curatives that in a formulated epoxy system remain inactive under normal ambient conditions but react readily with the epoxy resin at elevated temperatures. "Accelerators" are those materials that accelerate the reaction between the epoxy resin and the curing agent. "One component" epoxy compositions are typically a blend of an epoxy resin, a curing agent and optionally an accelerator as well as additives and fillers. "100% solids" means the epoxy composition contains no water or organic solvent.

BRIEF SUMMARY OF THE INVENTION

The present invention provides a reaction product of (a) a phenolic resin and (b) a urea compound and the use of the reaction product as a latent curing agent or as an accelerator for latent curing agents in heat curable one-component epoxy resin compositions. The urea compound comprises the reaction product of an isocyanate and an alkylated polyalkylenepolyamine. One-component epoxy resin compositions comprise the contact product of a latent curing agent, optionally but preferably an accelerator for the curing agent, and an epoxy resin.

In one aspect of the invention the latent curing agent, or the accelerator, comprises the reaction product of (a) phenolic resin and (b) a urea compound which is the reaction product of an isocyanate and an alkylated polyalkylenepolyamine having at least one primary or secondary amine and at least two tertiary amines of the general formula:

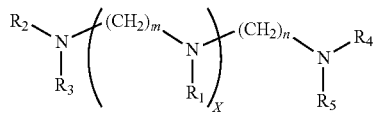

where $R_1$, $R_2$, $R_3$, $R_4$ and $R_5$ independently represent hydrogen, methyl or ethyl; n and m independently are integers from 1 to 6 and; X is an integer from 1 to 10. An aspect of the invention is the phenolic resin-urea compound reaction product itself.

In another aspect of the invention the one-component epoxy resin composition comprises the contact product of such phenolic resin-urea compound reaction product as a curing agent, optionally an accelerator for the curing agent, and an epoxy resin. In another aspect of the invention the one-component epoxy resin composition comprises the contact product of dicyandiamide or an acid anhydride as a latent curing agent, such phenolic resin-urea compound reaction product as an accelerator for the curing agent, and an epoxy resin.

An aspect the invention is directed to such phenolic resin-urea compound reaction product as epoxy curing agents and their use in one-component heat curable epoxy compositions, such as 100% solids compositions and water-based compositions.

Yet another aspect the present invention is directed to such phenolic resin-urea compound reaction products as accelerators for latent curing agents, such as dicyandiamide or acid anhydride, and their use in one-component heat curable epoxy compositions, such as 100% solids compositions and water-based compositions.

Among the various aspects of the invention comprising such phenolic resin-urea compound reaction products are the following:

a curing agent for heat cured one-component epoxy compositions.
  an accelerator for latent curing agents in heat cured one-component epoxy compositions.
  one-component 100% solids epoxy compositions comprising a phenolic resin-urea compound reaction product, a latent curing agent, such as dicyandiamide or acid anhydride, and an epoxy resin which offer low-temperature cure and shelf stability, i.e., longer latency.
  one-component water based epoxy compositions comprising a phenolic resin-urea compound reaction product, a latent curing agent, such as dicyandiamide or acid anhydride, and an epoxy resin which offer low-temperature cure and shelf stability, i.e., longer latency.
  one-component 100% solids epoxy compositions comprising a phenolic resin-urea compound reaction product as a latent curing agent, optionally an accelerator, and an epoxy resin which offer low-temperature cure and shelf stability, i.e., longer latency.
  one-component water based epoxy compositions comprising a phenolic resin-urea compound reaction product as a latent curing agent, optionally an accelerator, and an epoxy resin which offer low-temperature cure and shelf stability, i.e., longer latency.

Phenolic resin-urea compound reaction product of the invention have been found to cure epoxy resin compositions at low temperature and can be used as the sole curing agent or as an accelerator for latent curing agents such as dicyandiamide (DICY) or acid anhydrides in one-component epoxy resin compositions.

Epoxy compositions containing the phenolic resin-urea compound reaction products as sole curing agents or accelerators can afford long pot-life, low activation temperature, good glass transition temperature, or a combination of these attributes.

Every aspect and every embodiment of the invention as disclosed herein is meant to be combined with all the other disclosed aspects and embodiments of the invention individually and in all possible combinations thereof.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions described herein. In addition, in contacting the components together two or more of the components may react to form other components.

DRAWING

FIG. 1 shows the viscosity change over time for the compositions of Examples A-G at 80° C. as measured by Dynamic Mechanical Analysis.

DETAILED DESCRIPTION OF THE INVENTION

The invention relates to certain phenolic resin-urea compound reaction product compositions and their use as curing agents or as accelerators for latent curing agents, such as dicyandiamide or acid anhydride, in curing epoxy resin compositions.

The latent curing agent and the accelerator for latent curing agents are a composition which is the reaction product of (a) a phenolic resin and (b) a urea compound.

In one aspect of the invention the phenolic resin (a) is of general formula (A)

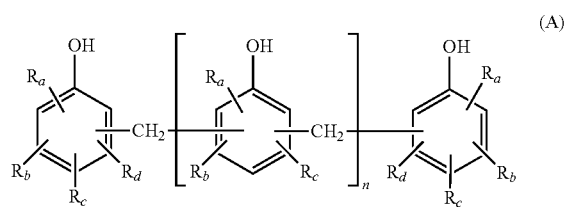

(A)

where $R_a$, $R_b$, $R_c$, $R_d$ are each independently a hydrogen or a branched or unbranched C1-C17 alkyl group, and n is an integer from 0 to 50. In a preferred aspect $R_a$, $R_b$, $R_c$, $R_d$ are each independently a hydrogen or a branched or unbranched C1-C10 alkyl group, and n is an integer from 0 to 10. In these aspects, suitable alkyl groups include methyl, ethyl, n-propyl, isopropyl, and all the isomers of butyl, pentyl, hexyl, octyl, including 2-ethyhexyl, decyl, and dodecyl. In another embodiment of the phenolic resin, $R_a$-$R_d$ are each hydrogen. For other aspects of each of the foregoing aspects and embodiments, the $R_a$-$R_d$ substituents are selected individually or in any combination.

In one aspect of the invention the urea compound (b) which is the reaction product of an isocyanate and an alkylated polyalkylenepolyamine having at least one primary or secondary amine and at least two tertiary amines of the general formula (B):

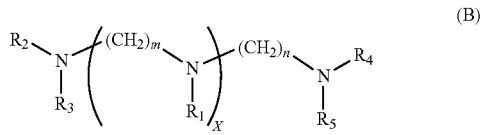

(B)

where $R_1$, $R_2$, $R_3$, $R_4$ and $R_5$ independently represent hydrogen, methyl or ethyl; n and m are independently integers from 1 to 6 and; X is an integer from 1 to 10. In a preferred aspect $R_1$ represents hydrogen or methyl; $R_2$ and $R_4$ represent methyl; $R_3$ and $R_5$ represent hydrogen or methyl, i.e., a methylated polyalkylenepolyamine.

For other aspects of each of the foregoing aspects and embodiments, the $R_1$-$R_5$ substituents are selected individually or in any combination provided the amine molecule has one primary or secondary amine and at least two tertiary amines.

Yet in other aspects of each of the foregoing aspects and embodiments, integers m, n and X are selected individually or in any combination of each other over the ranges stated above for each, with certain aspects of m and n being 2 or 3 and X being 1 to 7; m and n being 3 and X being 1; and m and n being 3 and X being 1-7.

Isocyanates useful for reacting with the polyalkylenepolyamine are any of the aliphatic isocyanates, cycloaliphatic isocyanates and aromatic isocyanates in which the isocyanate functionality —NCO is bonded directly to the aromatic ring. Suitable isocyanates include phenylisocyanate, toluene diisocyanate (TDI) including 2,4-TDI, 2,6-TDI and 2,4/2,6-TDI, methylene diphenyl diisocyanate (MDI) including its polymethylene polyphenylene poly(isocyanate) polymeric homologs, i.e., polymeric MDI.

Every aspect and every embodiment of the invention as disclosed herein is intended to be combined with all the other disclosed aspects and embodiments of the invention individually and in all possible combinations thereof.

The urea compounds of the invention can be prepared by reactions well known to a chemist and are reported in the literature such as in Jerry March, Advanced Organic Chemistry, Wiley-Interscience, Fourth Edition, page 1299. Basically, the isocyanate and the polyamine are reacted in a polyamine:isocyanate equivalents ratio of 1:1 for polyamines having one primary or secondary amine and isocyanates having one NCO group, 1:2 for polyamines having a total of two primary and/or secondary amines and isocyanates having one NCO group, 2:1 for polyamines having one primary or secondary amine and isocyanates having two NCO groups; optionally in a solvent such as toluene at elevated temperatures of 50-100° C. under an inert atmosphere at ambient pressure. In addition, the urea compounds are available commercially from Sigma Aldrich, Air Products and Chemicals, Inc., CVC Specialty Chemicals, and AlChem.

In an aspect of the invention suitable polyalkylenepolyamines for reacting with the isocyanate include 3,3'-iminobis(N,N-dimethylpropylamine), also known as N'-(3-dimethylaminopropyl)-N,N-dimethylpropane-1,3-diamine and available as Polycat® 15 catalyst from Air Products and Chemicals, Inc. and poly-N-methyl-azetidine, the preparation and structures of which are taught in U.S. 2008-0194776-A1 the disclosure of which is incorporated by reference herein. This aspect is meant to be combined with all other disclosed aspects and embodiments of the invention.

In an aspect of the invention the phenolic resin is a novolac resin, a compound formed by the condensation of a phenol with an aldehyde, especially formaldehyde. Novolac resins are the reaction product of a mono or dialdehyde, most usually formaldehyde, with a mono or polyphenolic material. Examples of monophenolic materials which may be utilized include phenol, the cresols, p-tert-butylphenol, nonylphenol, octylphenol, other alkyl and phenyl substituted phenols. Polyphenolic materials include the various diphenols including bisphenol-A and bisphenol-F. Aldehydes which are utilized for the novolac include formaldehyde, glyoxal, and the higher aldehydes up to about C4. The novolacs typically are complex mixtures with different degrees of hydroxyl functionality.

The novolac resins can be prepared by the reaction of phenol or substituted phenol with an aldehyde, especially formaldehyde, in the presence of an acid or base. Novolac resins also are commercially available under the trademark Alnovol™ from Cytec Specialty Chemicals.

The phenolic resins are reacted with the urea compounds at elevated temperatures of 120 to 180° C. A sufficient amount of the phenol resin is reacted to block substantially all of the tertiary amine functionalities in the urea composition. As a general rule, about 25 wt % to 60 wt % phenolic resin, based on urea compounds, is added to and reacted with the urea composition. If not enough phenol resin is added, the resulting product is sticky and clumps. If too much is added, the activation temperature to cure the epoxy resin becomes too high.

The phenolic resin-urea compound reaction products can be used as epoxy curing agents in one-component and two-component epoxy compositions such as adhesives, decorative and protective coatings including powder coatings, filament winding, printed circuit board and other epoxy applications. Typically, 0.5 to 10 parts by weight (pbw) phenolic resin-urea compound reaction products are used in the epoxy composition per 100 pbw epoxy resin, preferably 2 to 6 pbw of phenolic resin-urea compound reaction products.

The phenolic resin-urea compound reaction products can also be used as accelerators for curing agents, such as dicyandiamide and acid anhydrides like acetic anhydride, in one-component and two-component epoxy compositions such as adhesives, decorative and protective coatings including powder coatings, filament winding, printed circuit board and like epoxy applications. Typically, 0.5 to 10 parts by weight (pbw) curing agent are used in the epoxy composition per 100 pbw epoxy resin, preferably 2 to 6 pbw of curing agent, and 0.5 to 10 parts by weight (pbw) phenolic resin-urea compound reaction products are used as an accelerator in the epoxy composition per 100 pbw epoxy resin, preferably 2 to 6 pbw of phenolic resin-urea compound reaction products.

The phenolic resin-urea compound reaction products as a curing agent or as an accelerator with the a curing agent is combined with an epoxy resin which is a polyepoxy compound containing more than one 1,2-epoxy groups per molecule. Such epoxides are well known in the epoxy art and are described in Y. Tanaka, "Synthesis and Characteristics of Epoxides", in C. A. May, ed., Epoxy Resins Chemistry and Technology (Marcel Dekker, 1988). Examples include those epoxides disclosed in U.S. Pat. No. 5,599,855 (Col 5/6 to 6/20), which is incorporated by reference. The preferred polyepoxy compounds are the diglycidyl ethers of bisphenol-A, the advanced diglycidyl ethers of bisphenol-A, the diglycidyl ethers of bisphenol-F, and the epoxy novolac resins. Both liquid epoxy resins and solid epoxy resins are suitably used in the one component epoxy compositions. Powder coating compositions would comprise a solid epoxy resin, a urea compound and dicyandiamide.

Epoxy compositions comprising phenolic resin-urea compound reaction products and epoxy resins can be formulated with a wide variety of ingredients well known to those skilled in the art of coating formulation, including solvents, fillers, pigments, pigment dispersing agents, rheology modifiers, thixotropes, flow and leveling aids, and defoamers.

While one component epoxy compositions comprising 1 to 90 wt % organic solvents, or 100 wt % solids epoxy compositions, or water-based, i.e., aqueous, epoxy compositions containing 20 to 80 wt % solids can be used, it is preferred the epoxy composition be 100 wt % solids.

The epoxy compositions of this invention can be applied as coatings by any number of techniques including spray, brush, roller, paint mitt, and the like. Numerous substrates are suitable for application of coatings of this invention with proper surface preparation, as is well understood in the art. Such substrates include but are not limited to many types of metal, particularly steel and aluminum, as well as concrete.

One component epoxy compositions of this invention can be cured at elevated temperatures ranging from about 80° C. to about 240° C., with cure temperatures of 120° C. to 160° C. preferred. Two component epoxy compositions of this invention can be cured at temperatures ranging from about 80° C. to about 240° C., with cure temperatures of 80° C. to 160° C. preferred.

The materials used in the following examples:
N'-(3-dimethylaminopropyl)-N,N-dimethyl-propane-1,3-diamine—Polycat®15 catalyst from Air Products and Chemicals, Inc.
Toluene diisocyanate—from Sigma-Aldrich
Phenyl isocyanate—from Sigma-Aldrich
Polymeric (methylene diphenyl diisocyanate)—from Huntsman
Phenolic resin—(AlNovol PN320) from Cytec Specialty Chemicals

Example A

A mixture of 220.3 g of N'-(3-dimethylaminopropyl)-N,N-dimethyl-propane-1,3-diamine and 50 g of toluene were charged to a one liter four-neck glass vessel equipped with an air driven mechanical stirrer, thermocouple, heating jacket with a water circulating bath and a nitrogen purge. The vessel was heated to 60-70° C. under nitrogen. Once the temperature stabilized, 104.9 g of toluene diisocyanate in 50 g of toluene was metered in over 45-60 minutes. The mixture was held at 70° C. for one hour after the addition was completed. The temperature was lowered to 40° C. and the reactor crude liquid product was placed on a rotary evaporator to remove all of the toluene. Temperature and vacuum was applied slowly to prevent frothing. The final conditions for the distillation were a 15 minute hold at 10-20 mmHg and 80° C. The stripped product was then placed in a three neck flask equipped with a mechanical stirrer, thermocouple, electric heating mantle and a nitrogen purge. The vessel was stabilized at 140-160° C. and 174.8 g of phenolic resin was added over a 30-60 min period. The mixture was kept at 160° C. with stilling for an additional hour. The product was poured from the reactor at that and allowed to cool to ambient before grinding the product.

Example B 149.6 g of N'-(3-dimethylaminopropyl)-N,N-dimethyl-propane-1,3-diamine were charged to a one liter four-neck glass vessel equipped with an air driven mechanical stirrer, thermocouple, heating jacket with a water circulating bath and a nitrogen purge. The vessel was heated to 60-70° C. under nitrogen. Once the temperature stabilized, 95.2 g of phenylisocyanate was metered in over 1.5 hr while maintaining the temperature between 70 and 80° C. The mixture was held at that temperature for one hour after the addition was complete. The vessel was stabilized at 130-160° C. and 240 g of phenolic resin were added over a 30-60 min period. The mixture was kept at 160° C. with stirring for an additional hour. The product was poured from the reactor at that temperature and allowed to cool to ambient before grinding the product.

Example C 252 g of N'-(3-dimethylaminopropyl)-N,N-dimethyl-propane-1,3-diamine were charged to a one liter four-neck glass vessel equipped with an air driven mechanical stirrer, thermocouple, heating jacket with a water circulating bath and a nitrogen purge. The vessel was heated to 60-80° C. under nitrogen. Once the temperature stabilized, 200 g of polymeric methylene diphenyl diisocyanate were metered in over two hours while maintaining the temperature between 70 and 80° C. The mixture was held at 80° C. for one hour after the addition was complete. The vessel was stabilized at 130-160° C. and 88 g of phenolic resin were added over a 30-60 min period. The mixture was kept at 160° C. with stirring for an additional hour. The product was poured from the reactor at that temperature and allowed to cool to ambient before grinding the product.

Example D

Commercially Available 3-[4-[[4 (dimethylcarbamoylamino) phenyl]methyl]phenyl]-1,1-dimethyl-urea Example E Commercially Available 1,1-dimethyl-3-phenyl-urea Example F Commercially Available N,N-Dimethyl, N'-3,4-dichlorophenyl-urea Example G Commercially Available 3-[5-(dimethyl carbamoylamino)-2-methyl-phenyl]-1,1-dimethyl-urea The commercial dimethylamine-isocyanate adducts of Examples D-G and the phenolic resin-urea reaction products of Examples A-C were screened by differential scanning calorimeter (DSC) for their cure profile as epoxy curing agents. The epoxy formulation comprised polyglycidyl ether of Bisphenol A resin (Epon 828), 5 phr, 3 phr and 1 phr (wt parts per 100 wt parts resin) of Examples A-G as the accelerator, 6 phr of dicyandiamide as the curing agent and 1% fumed silica. The resulting mixtures were blended thoroughly for 2 minutes using a high sheer cowls blade mixer. Immediately after preparation the mixtures were examined by DSC to determine the onset temperature and the glass transition temperature (Tg). The DSC analysis was performed using a 10° C./min ramp heat rate on about a 10 to 15 mg sample of material. The resulting data is presented in Table 1 and shows at higher loadings the reaction products of phenolic resin and the N'-(3-dimethylaminopropyl)-N,N-dimethyl-propane-1, 3-diamine based ureas of Examples A-C provided lower activation temperature and higher Tgs than the dimethylamine based products.

TABLE 1

| | 5 PHR | | 3 PHR | | 1 PHR | |
|---|---|---|---|---|---|---|
| EX | Onset Temp (° C.) | Tg (° C.) | Onset Temp (° C.) | Tg (° C.) | Onset Temp (° C.) | Tg (° C.) |
| A | 130 | 129 | 131 | 125 | 143 | 134 |
| B | 125 | 135 | 126 | 131 | 142 | 138 |
| C | 110 | 126 | 127 | 131 | 135 | 137 |
| D | 142 | 118 | 144 | 124 | 148 | 66 |
| E | 141 | 98 | 143 | 97 | 147 | 65 |
| F | 142 | 103 | 146 | 105 | 150 | 80 |
| G | 135 | 113 | 138 | 121 | 144 | 134 |

Latency, or pot-life, of Examples A, C, D, E, F and G as an accelerator were studied at 40° C. using an epoxy formulation that comprised polyglycidyl ether of Bisphenol A resin (Epon 828), 2 phr of the accelerator, 6 phr of dicyandiamide as the curing agent and 1% fumed silica. The resulting mixtures were blended thoroughly for 2 minutes using a high sheer cowls blade mixer, cooled to 25° C. and the initial viscosity was measured using a Brookfield viscometer. The samples were stored in 140° C. oven, cooled to 25° C. and the viscosities changes measured over time. The resulting data is presented in Table 2 and shows phemolic resin blocked ureas of Examples A and C provided better stability at 40° C.

TABLE 2

| EX | Initial (mPa·s) | 1 week | 2 weeks | 3 weeks | 1 month | 4 months |
|---|---|---|---|---|---|---|
| A | 19930 | 18920 | 23600 | 22610 | 23470 | 40970 |
| C | 20867 | 21080 | 22960 | 20840 | 22290 | 32010 |
| D | 20340 | 22560 | 37660 | ■ | ■ | ■ |
| E | 16430 | 54410 | ■ | ■ | ■ | ■ |
| F | 16430 | 108500 | ■ | ■ | ■ | ■ |
| G | 21620 | ■ | ■ | ■ | ■ | ■ |

■ Gelled

Latency, or pot-life, of Examples A-G were studied at 80° C. using an epoxy formulation that comprised polyglycidyl ether of Bisphenol A resin (Epon 828), 5 phr of the accelerator, 6 phr of dicyandiamide as the curing agent and 1% fumed silica. The resulting mixtures were blended thoroughly for 2 minutes using a high sheer cowls blade mixer. The viscosities change over time was measured by Dynamic Mechanical Analysis (DMA). The samples were analyzed using a TA Instruments RDAIII controlled strain Rheometer. 25 mm disposable aluminum parallel plates were used for the test. The temperature was controlled at 50° C. using the oven thermocouple and the plate gap was zeroed. Enough sample was added between the plates to get a gap of approximately 1 mm and the oven was closed. The experiment was started using the following temperature program: Initial temperature of 50° C. was ramped to 80° C. at 10° C./min. The temperature was held at 80° C. for at least 1000 min. Dynamic measurements were taken every 60 sec. with a initial strain rate of 50% which was automatically adjusted to a maximum of 300% to maintain a minimum torque value of 1 g-cm. A maximum change of 50% of the previously measured strain rate was made at each measurement point. The resulting data is depicted in FIG. 1 and shows that the phenol resin blocked ureas provided better stability at 80° C.

We claim:

1. A reaction product of (a) a phenolic resin and (b) a urea compound; wherein the urea compound is the reaction product of an isocyanate and an alkylated polyalkylenepolyamine of the general formula:

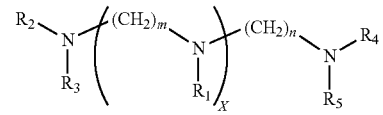

where $R_1$, $R_2$, $R_3$, $R_4$, and $R_5$ independently represent hydrogen, methyl or ethyl, provided that the alkylated polyalkylenepolyamine has at least one primary or secondary amine and at least two tertiary amines; n and m are independently integers from 1 to 6 and; and X is an integer from 1 to 10.

2. The reaction product of claim 1 where $R_1$ represents hydrogen or methyl, $R_2$ and $R_4$ represent methyl, and $R_3$ and $R_5$ independently represent hydrogen or methyl, provided that the alkylated polyalkylenepolyamine has at least one primary or secondary amine and at least two tertiary amines; n and m independently are integers from 1 to 6 and; and X is an integer from 1 to 10.

3. The reaction product of claim 2 in which n and m are independently 2 or 3.

4. The reaction product of claim 2 in which X is 1 to 7.

5. The reaction product of claim 1 in which the phenolic resin is a novolac resin.

6. The reaction product of claim 1 in which the phenolic resin is of general formula (A)

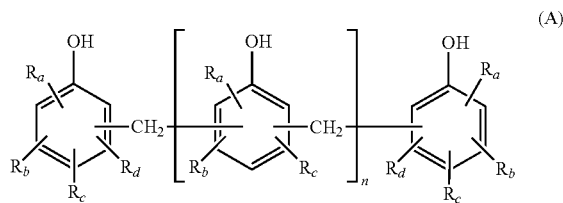

(A)

where $R_a$, $R_b$, $R_c$, and $R_d$ are each independently a hydrogen or a branched or unbranched $C_1$-$C_{17}$ alkyl group; and n is an integer from 0 to 50.

7. The reaction product of claim 1 in which the alkylated polyalkylenepolyamine is N'-(3-dimethylaminopropyl)-N,N-dimethyl-propane-1,3-diamine.

8. The reaction product of claim 1 in which the isocyanate is selected from phenylisocyanate, toluene diisocyanate (TDI), methylene diphenyl diisocyanate (MDI), and polymeric MDI.

9. A heat curable epoxy composition comprising a contact product of: an epoxy resin, an epoxy curing agent, and an accelerator for the epoxy curing agent; wherein the accelerator comprises the reaction product of claim 1.

10. The epoxy composition of claim 9 in which the curing agent is dicyandiamide or an acid anhydride.

11. The epoxy composition of claim 9 which is a 100% solids epoxy composition.

12. The epoxy composition of claim 9 which is an aqueous solids epoxy composition of 20 to 80 wt % solids.

13. The epoxy composition of claim 9 in which the epoxy resin is selected from a diglycidyl ether of bisphenol-A, an advanced diglycidyl ether of bisphenol-A, a diglycidyl ether of bisphenol-F, and an epoxy novolac resin.

14. The epoxy composition of claim 9 in which: the phenolic resin is a novolac resin; the isocyanate is selected from phenylisocyanate, toluene diisocyanate (TDI), methylene diphenyl diisocyanate (MDI), and polymeric MDI; the polyamine is N'-(3-dimethyl-aminopropyl)-N,N-dimethyl-propane-1,3-diamine; and the epoxy resin is selected from a diglycidyl ether of bisphenol-A, an advanced diglycidyl ether of bisphenol-A, a diglycidyl ether of bisphenol-F, and an epoxy novolac resin.

15. The epoxy composition of claim 9 in which n and m are independently 2 or 3.

16. The epoxy composition of claim 9 in which X is 1 to 7.

17. The epoxy composition of claim 9 in which the polyamine is N'-(3-dimethyl-aminopropyl)-N,N-dimethyl-propane-1,3-diamine.

18. The epoxy composition of claim 9 in which the isocyanate is selected from phenylisocyanate, toluene diisocyanate (TDI), methylene diphenyl diisocyanate (MDI), and polymeric MDI.

19. A heat curable epoxy composition comprising a contact product of: an epoxy resin, an epoxy curing agent, and optionally an accelerator for the epoxy curing agent; wherein the curing agent comprises the reaction product of claim 1.

20. The epoxy composition of claim 19 which is a 100% solids epoxy composition.

21. The epoxy composition of claim 19 which is an aqueous solids epoxy composition of 20 to 80 wt % solids.

* * * * *